United States Patent [19]
Cyr

[11] Patent Number: 5,436,432
[45] Date of Patent: Jul. 25, 1995

[54] MICROWAVE AUTOCLAVE APPARATUS

[76] Inventor: Samuel A. Cyr, 155 Martin Street, P.O. Box 480, St-Basile, New Brunswick, Canada, E0L 1H0

[21] Appl. No.: 135,538

[22] Filed: Oct. 14, 1993

[51] Int. Cl.⁶ .............................................. H05B 6/78
[52] U.S. Cl. ................................. 219/700; 219/701; 219/686; 219/725; 99/451; 99/443 C; 426/243
[58] Field of Search ............... 219/700, 701, 699, 710, 219/748, 751, 734, 725, 686; 99/451, DIG. 14, 360, 362, 361, 371, 443 C; 426/241, 243

[56] References Cited

U.S. PATENT DOCUMENTS

| | | | |
|---|---|---|---|
| 3,551,090 | 12/1970 | Brumfield et al. | 219/686 |
| 3,718,082 | 2/1973 | Lipoma | 99/470 |
| 3,782,269 | 1/1974 | Latham et al. | 99/443 C |
| 3,795,183 | 3/1974 | Roth et al. | 99/451 |
| 3,961,569 | 6/1976 | Kenyon et al. | 99/451 |
| 3,974,353 | 8/1976 | Goltsos | 219/700 |
| 4,246,462 | 1/1981 | Meisel | 219/701 |
| 4,406,861 | 9/1983 | Beauvais et al. | 219/686 |
| 4,490,597 | 12/1984 | Mengel | 219/686 |
| 4,773,321 | 9/1988 | Wijts | 99/468 |
| 4,808,782 | 2/1989 | Nakagawa et al. | 219/701 |
| 4,836,098 | 6/1989 | Shah | 99/360 |
| 5,039,001 | 8/1991 | Kinigakis et al. | 229/120 |
| 5,044,264 | 9/1991 | Forney | 99/443 C |
| 5,074,200 | 12/1991 | Ruozi | 99/451 |
| 5,160,819 | 11/1992 | Ball et al. | 219/700 |
| 5,207,151 | 5/1993 | Le Vigt et al. | 99/451 |

Primary Examiner—Philip H. Leung

[57] ABSTRACT

A new microwave autoclave apparatus, and a method for pasteurizing, sterilizing or retorting food product in a continuous mode, and in commercial quantities, using microwave radiant energy. In this new microwave autoclave apparatus, containers of food-stuff are held tightly within individual moving bottom vessel, and a corresponding moving top cover. The moulds therefrom, made of a material which is permeable to microwave radiation, are linked together to form a chain such that a continuous flow of container enters and leaves a microwave chamber. The synchronization of the moving top covers with the moving bottom vessels, and the opposing forces applied thereupon provide tightly fitted cavities capable of supporting substantial pressure, and thus providing a retort effect. The moulds prevent undesired expansion of containers during heating periods, without applying adverse pressure beyond its original shape during the cooling phase.

30 Claims, 4 Drawing Sheets

MICROWAVE AUTOCLAVE APPARATUS

BACKGROUND OF THE INVENTION

The present invention relates to an apparatus for filling, pasteurizing, sterilizing, retorting, and sealing food product in a continuous manner, and in commercial quantities, in a food container which is pellucid to microwave radiant energy.

There is an increasing need for mass production of retort prepared food, which is suitable for consumer convenience and health, as for canned food. A number of well developed methods for retorting, sterilizing, filling and sealing such food are available. However, cans represent a relatively costly means for packaging, and hence, alternate packages are of great interest.

The temperature required for retorting and sterilization of food product is substantially above the boiling point of water at atmospheric pressure. Usually a temperature of about 120° C. is preferred. At that temperature, the thermal death time of the bacteria is reduced to a matter of seconds. Food engineering teaches that the normal rate of destruction of bacteria usually increases 10 to 20 times, for each 10° C. rise of temperature above boiling point. Furthermore, it is well known that some foodstuff maintain better quality when sterilized in a shorter time at higher temperature.

In high temperature-short time sterilization, a high rate of heat penetration in the food is needed. The retorting and sterilization of food using microwave energy is particularly suitable to obtain such high heat absorbtion. Therefore, since the commercialization of microwave ovens, considerable resources have been directed to the research and development of microwave apparatus capable of processing pre-packed dishes in large volumes, and in a continuous mode.

New discoveries have produced containers and vessels permeable to microwave radiant energy, with such preservation properties that they can replace tins as containers for foods. One example of such microwavable package is disclosed in Kinigakis et al U.S. Pat. No. 5,039,001, Aug. 13, 1991. Accordingly and concurrently, the demand for preparing foodstuff in non-metallic packages using microwave energy has increased considerably.

In a microwave environment, the food molecules become highly agitated and produce a "friction" which manifests itself by the immediate release of heat energy within the food and surrounding media. Upon the release of heat, pressure inside the container inevitably increases. The container could thereby be damaged if no protection is provided to counterbalance such internal pressure. Several prior art equipment use pressurized cooking chambers to prevent such container expansion.

Kenyon et al, U.S. Pat. No. 3,961,569, Jun. 8, 1976, discloses a continuous microwave sterilization apparatus which has a pressurized enclosure to prevent bursting of flexible pouches containing food.

Ruozi U.S. Pat. No. 5,074,200, Dec. 24, 1991, discloses another type of pressurized apparatus having different compartments and means of maintaining different pressure within different compartment, Pressurized tunnels and tanks are further disclosed in Lipoma U.S. Pat. No. 3,718,082, Feb. 27, 1973 and in Wijts U.S. Pat. No. 4,773,321, Sep. 27, 1988.

In a closed container, the pressure is known to increase proportionally to the temperature rise within that container. Therefore, continuous microwave apparatus having uniformly pressurized chambers are unable of maintaining ideal pressure requirement during all phases of the process. For example, a pressure setting to countervail maximum internal forces in a container near the end of its cooking cycle, could collapse a container entering a microwave chamber where the internal temperature is almost ambient. The same damage will also occur when that container travels through a cooling chamber, and its temperature decreases substantially. Consequently, the pressure inside those pressurized enclosures is adjusted midway between bursting and collapsing pressures, hoping that the container will resist any residual forces.

Pressurized chambers suffers also from the inconvenience of complicated pressure holding doors, which are not particularly adapted for continuous processes.

Furthermore, continuous microwave apparatus having pressurized chambers are limited to the processing of sealed packages, containing all ingredients of a recipe. For example, sensitive meat like fish receives the same amount of energy as the surrounding sauce and vegetable within that container. The texture of the meat may suffer from over-cooking in order to obtain ideal exposure for carrots or broccoli. Therefore, these microwave apparatus are not practical to process multiple elements dishes.

SUMMARY OF THE INVENTION

This new microwave autoclave apparatus however has no pressure tunnel, no pressure holding door and no pressure compensating equipment.

In this new microwave autoclave apparatus, a plurality of moving bottom vessels are linked together to form a chain of moving bottom vessels. Similarly, a plurality of moving top covers are linked together to form a chain of moving top covers. Both the moving bottom vessels and the moving top covers are made of a material which is pellucid to microwave radiation.

Each container containing foodstuff is held tightly within a moving bottom vessel and a corresponding moving top cover. The mould therefrom prevents undesired expansion of a container during heating periods, without applying adverse pressure beyond its original shape during the cooling phase.

The chain of moving bottom vessels, and the chain of moving top covers are arranged so that a continuous flow of container enters and leaves a microwave chamber. The synchronization of the moving top covers with the moving bottom vessels, and the opposing forces applied thereupon provide tightly fitted cavities capable of supporting a substantial internal pressure, and thus providing a retort effect.

Pressure cooking or retort effect is known to increase the boiling point of foodstuff, thereby minimizing loss of moisture of the food during the cooking process.

The new microwave autoclave apparatus is arranged so that a chain of moving bottom vessels travels successively through several microwave chambers, through a cooling chamber, and through lid placement or sealing chamber, not necessarily configured in this order. Each microwave module contains its own chain of moving top covers to synchronously adapt to the common chain of moving bottom vessels.

The principal advantage of this arrangement is that container filling stations, to add various ingredients, can be inserted in between successive microwave modules, providing thereby a method of processing different elements of a recipe within a continuous system.

Each microwave module is calibrated with proper heating and passive periods so that a container enters and leaves each module at atmospheric pressure. A multitude of process combinations can be pre-set to accommodate a variety of intricate recipes. For example, a first module can be set to provide a pasteurizing phase, while the next ones can be set to retort and simmer.

With this new microwave autoclave, it is possible to retort and sterilize almost any food product in a shorter time, and at higher temperature than with conventional batch-type method of sterilization and retort. From that fact, various factors that affect the quality of food, such as colour, taste, scent, and nutritive value are preserved.

Food engineering also teaches that valuable characteristics of foods is vulnerable to prolonged heat exposure. Consequently, when food is sterilized at a high rate of heat penetration, such as with microwave radiant energy, the bacteria like saprogenous bacilluses and other viable microorganisms are destroyed instantly, but considerable amounts of vitamins will survive. As a result, the foodstuff maintains almost the same appearance and shape as when it entered the microwave autoclave apparatus.

The new invention provides a means for preparing elegant dishes containing heat sensitive elements. Some examples of delicate dishes not possible with prior art equipment are: rainbow trout in clam sauce, lobster and garlic butter, mussels and onions, chicken, rice and lemon sauce.

The reduced labour cost and improved efficiency due to automation and sequential cooking method are additional advantages of this continuous retort and sterilizing microwave autoclave.

Other advantageous features of the present invention will be readily understood from the reading of the following description made in connection with the accompanying drawings which illustrate a preferred embodiment of the present invention.

A BRIEF DESCRIPTION OF THE DRAWINGS

The accompanying drawings will be briefly described as follows:

FIG. 1 illustrates an elevation view of the microwave autoclave apparatus. The drawing shows two microwave modules 10, two filling stations 16, one lid placement or/and sealing unit 17 and a cooling chamber 18.

Figure 3:
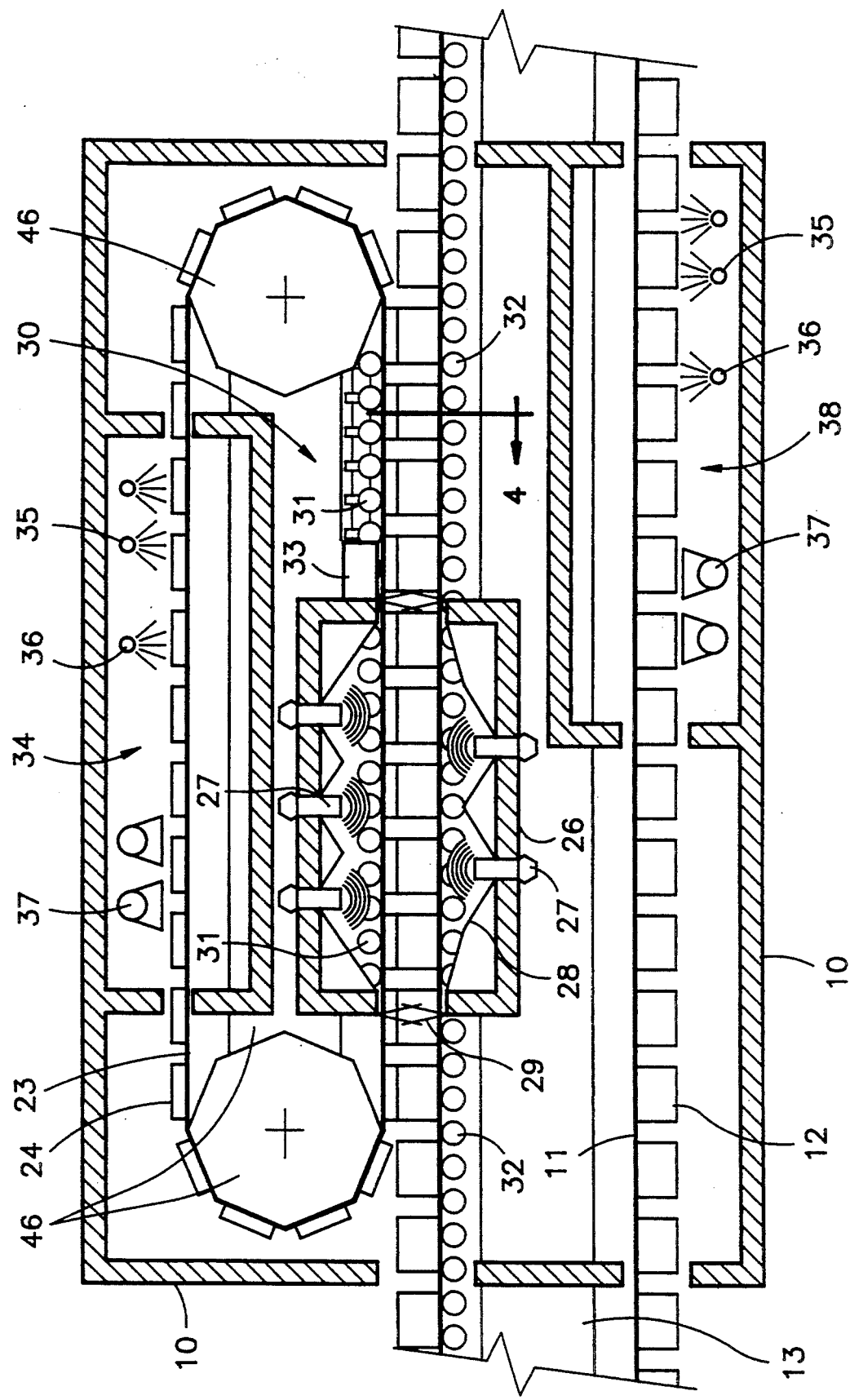
FIG. 3 is an enlarged view of the cross-section of a microwave module, which illustrates additional references to FIG. 2.
Figure 4:
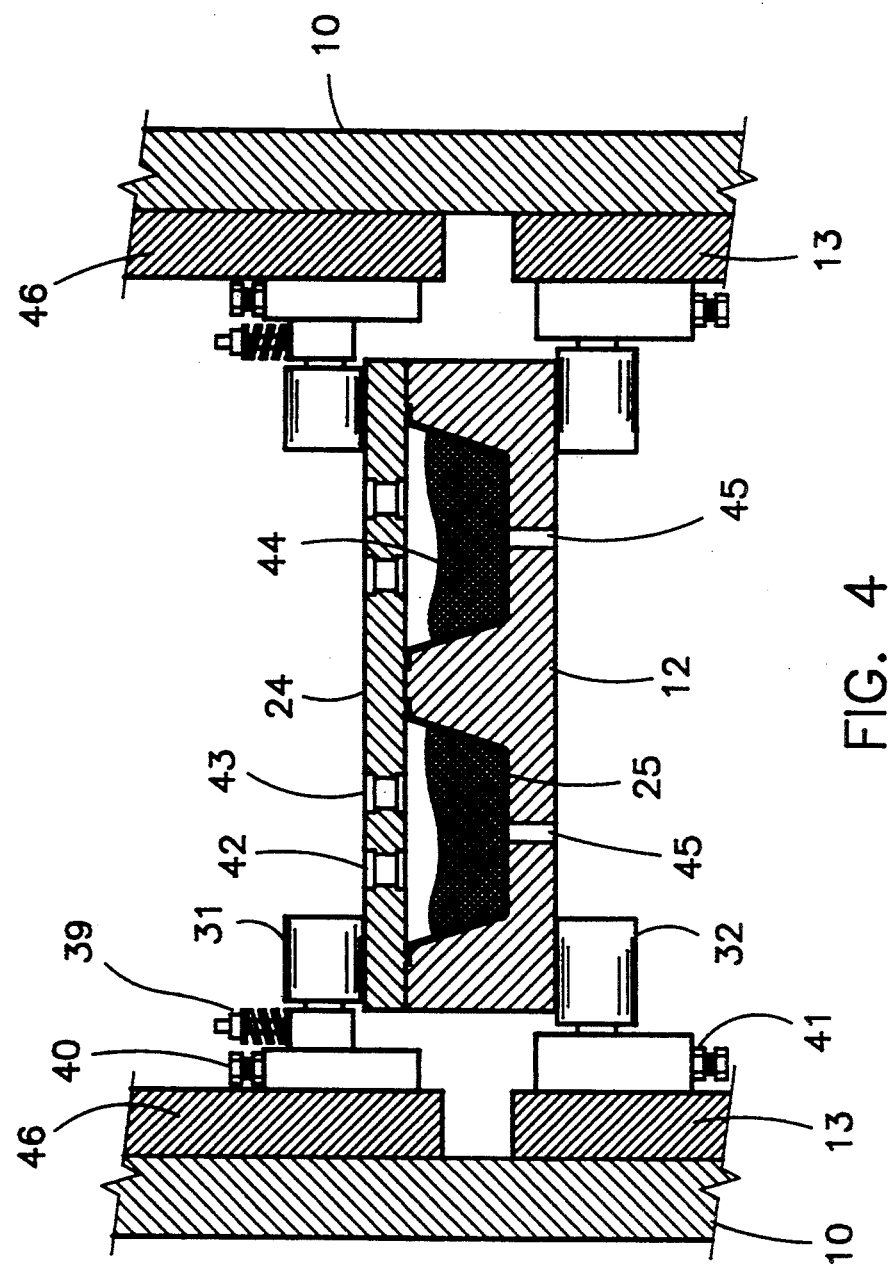

FIG. 4 is a cross-section of both the moving bottom vessel 12 and the moving top cover 24, along line 4—4 of FIG. 3.

DETAILED DESCRIPTION OF THE INVENTION

Figure 1:
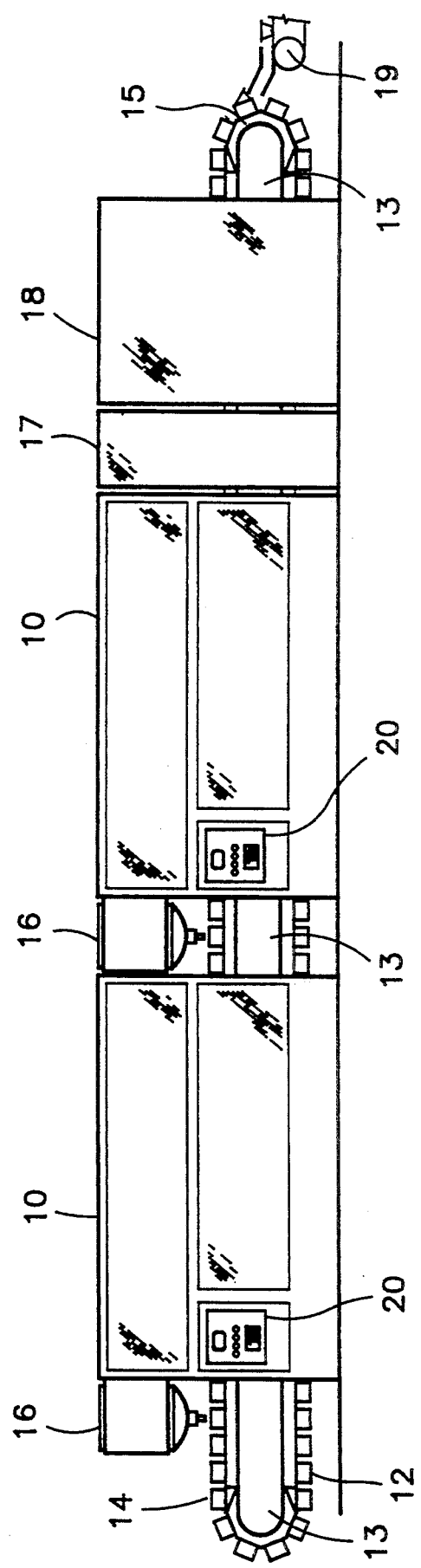

Referring to FIG. 1, the microwave autoclave apparatus comprises one or more microwave module 10, a conveying means 13 for actuating a plurality of moving bottom vessels 12, a container placement area 14 and a container transfer mechanism 15.

The apparatus may also contain filling stations 16, lid placement or/and sealing unit 17, a cooling chamber 18 and an exit conveyor 19.

The entire food preparation process is controlled by control unit 20 on one or more microwave module 10. The control unit 20 regulates the duration of the effect of the magnetrons, the temperature and pressure developed within each microwave chambers and the travelling speed of both the chain of moving top covers 24 and the chain of moving bottom vessels 12.

Proper control of these elements defines the type of process desired. For examples, a temperature of 61°-63° C. for a period of 30 minutes defines a pasteurizing action. Similarly, a temperature of above the boiling point of water, 100° C., within such tightly closed cavities, will provide a more intense sterilization, or a retort cooking effect.

Conveying means 13 is sufficiently long, to carry the moving bottom vessels 12 from the container placement area 14, in and out of each microwave modules 10, in and out of the lid placement or/and sealing unit 17, in and out of a cooling chamber 18 and through to a container transfer mechanism 15 at the exit end of this microwave autoclave apparatus.

Filling stations 16 are well known from prior art, and therefore are illustrated in a schematic manner. Filling stations can take the form of liquid fillers, semi-liquid dispensers, solid feeders or manual placement facilities.

Similarly known from prior art, the lid placement or/and sealing unit 17 may contain a vacuum packer, and/or a labelling machine. The cooling chamber 18 may have the ability to deep freeze containers of food product, or to simply moderate their internal temperature, in a continuous mode.

The new microwave autoclave apparatus can accommodate several types of container transfer mechanism 15. The arrangement suggested for this purpose, as it can be better seen on FIG. 2 consists of a series of plungers 21 activated by a central cam shaft 22.

Figure 2:
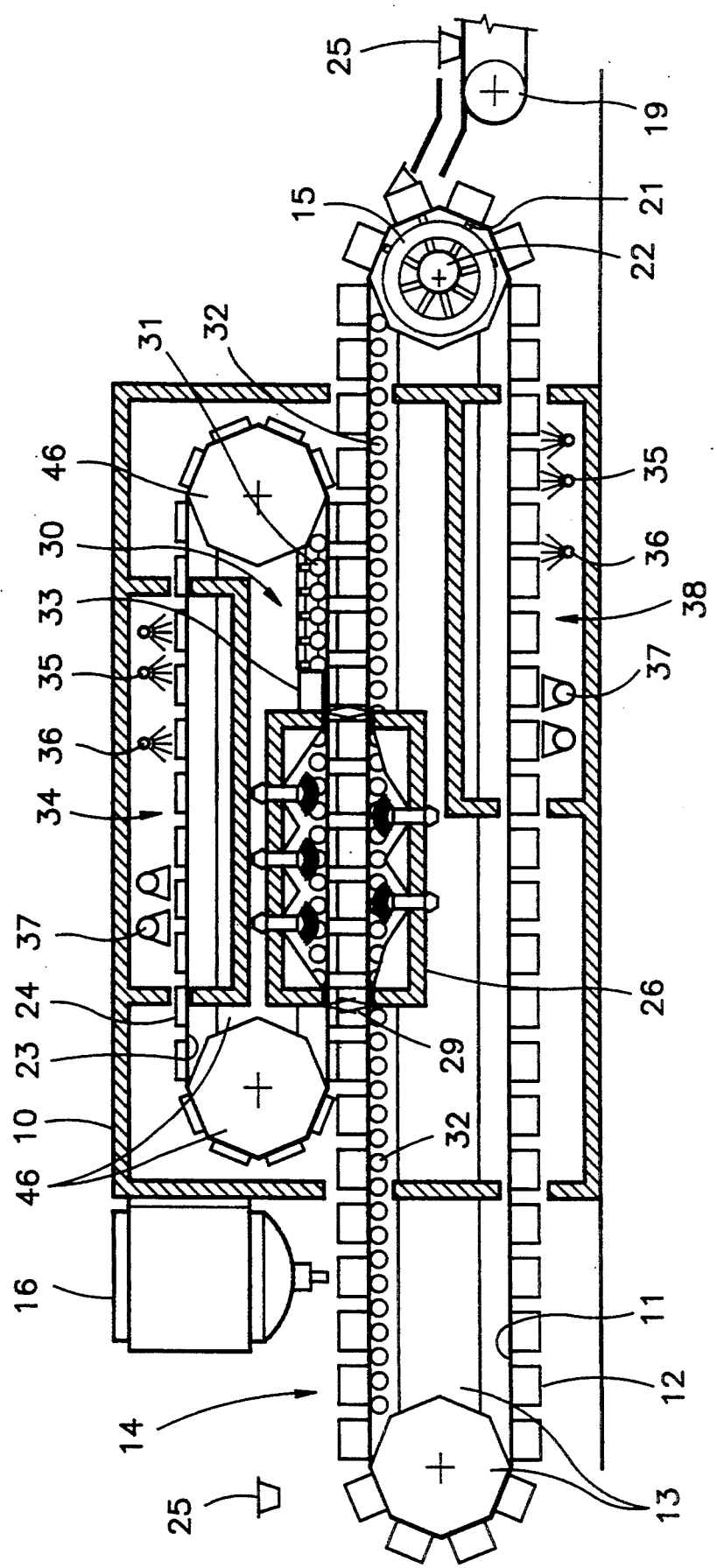
FIG. 2 shows a cross-section of a microwave module. The arrangement of the plurality of moving top covers 24 can be better appreciated on this drawing.

As it can be seen of FIG. 2, the moving bottom vessels 12 are linked to one another by linking means 11 to form a chain of moving bottom vessels 12. Similarly, moving top covers 24 are linked to one another by linking means 23 to form a chain of moving top covers 24.

Each microwave module 10 contains a microwave chamber 26, a passive chamber 30, a recirculating means 46 for actuating a chain of moving top covers 24 in and out of a microwave chamber 26, through a passive chamber 30, and through a moving top covers washing chamber 34. The recirculation of the moving top covers 24 is done such that each moving top cover 24 synchronously adapts over a respective moving bottom vessel 12 to thereby retain each container 25 within individually closed cavities during heating, simmering and cooling phases.

One of the microwave module 10, in a microwave autoclave apparatus, also contains a moving bottom vessels washing chamber 38.

The moving top covers washing chamber 34 and moving bottom vessels washing chamber 38 contains washing nozzles 35, rinsing nozzles 36 and air drying outlets 37. The purpose of these washing chambers is to clean and sterilize the moving bottom vessels 12 and moving top covers 24 before re-entry in the microwave chamber 26 or/and before receiving a new container 25 at the container placement area 14.

The entire length of chain of moving bottom vessels 12 is supported by lower support wheels 32 mounted on the structure of the conveying means 13.

The chain of moving top covers 24 is also guided by upper support wheels 31 throughout the microwave chamber 26 and the passive chamber 30. The upper support wheels 31 are mounted on the structure of the recirculating means 46.

As it can be better seen on FIG. 3, the microwave chamber 26 contains magnetrons 27 pointing upward and some pointing downward, so that heat absorbtion by the food product is improved from a bi-dimensional penetration. Reflectors 28 further ensures that any unused waves are reflected toward the cavities holding food containers 25. The microwave radiation is further contained within the microwave chamber 26 by sealing curtain means 29 at both the inlet and the outlet end of the chamber 26.

Inside the microwave module 10, a pressure/temperature reading means 33 monitors the degree of exposure of the container 25 inside the microwave chamber 26, and provides the necessary corrections to maintain compliance to a pre-set procedure.

At the exit end of the microwave chamber 26, a passive chamber 30 is provided to return the internal pressure of containers near atmospheric pressure. The length of this passive chamber 30 is established to satisfy specific procedures for the apparatus, such as; maximum temperature rise, travelling speed of the containers, recommended time period between introduction of ingredients, and so on. The passive chamber 30 may, in some cases, contain cooling means to reduce internal pressure of the containers in a shorter time period.

As it can be seen on FIG. 4, the upper support wheels 31 inside the passive chamber may be equipped with adjustable floating means 39 providing a means for relieving opposing forces retaining both the top moving cover and the bottom moving vessels together, and thus providing a means for relieving pressure inside containers 25. Adjustment of these adjustable floating means 39 may be varied throughout the length of the passive chamber 30 to obtain optimum return to atmospheric pressure. In case of a pre-sealed container it is obvious that these adjustable floating means 39 are set to maximum tension.

As it can also be better seen of FIG. 4, the upper support wheels 31, are mounted on the structure of the recirculating means 46, and the lower support wheels 32 are mounted on the structure of the conveying means 13. Both the upper support wheels 31 and the lower support wheels 32 are mounted by means of adjustable mounting devices 40 and 41 respectively, so that the support wheels can be displaced to accommodate vessels of different thicknesses.

Each moving top cover 24 is equipped with a temperature probe 42 and a pressure transducer 43 to monitor the condition of the foodstuff 44 inside the container 25. The probe 42 and transducer 43 are located to align in a travel path corresponding to the location of appropriate sensors within reading means 33, as it was earlier described, so that the condition of foodstuff 44 in a container 25 travelling directly under reading means 33 is immediately interpreted and input to control unit 20.

Each moving bottom vessel 12 has an opening 45 to align with the plunger 21 of the transfer mechanism means 15. The area of each opening 45 is kept relatively small to prevent bursting of the container 25 from internal pressure, and yet is sufficient to provide efficient removal of the container 25 from the moving bottom vessel 12 at the end of the process. The hole 45 also serves as a breather opening to facilitate placement of a container 25 into, and to facilitate removal of a container 25 from a moving bottom vessel 12.

Although a preferred embodiment of the invention has been described above, it is not limited thereto and it will be apparent to those skilled in the art that numerous modifications form part of the present invention insofar as they do not depart from the spirit, nature and scope of the claimed and described invention.

I claim:

1. A microwave autoclave apparatus for simmering, pasteurizing, sterilizing or retorting food product in a continuous mode, and in commercial quantity, using microwave radiant energy, comprising;
    a microwave tunnel oven means,
    a number of at least one vessel, each said vessel being made with a material which is pellucid to microwave radiation, each said vessel being shaped to receive said food product,
    a plurality of lower rolling members supporting said number of vessel and,
    a number of at least one cover, each said cover being also made with a material which is pellucid to microwave radiation, each said cover being shaped to correspond to an opening of said vessel,
    drive means to move said number of vessel and said number of cover through said microwave tunnel oven means, such that each said cover is synchronized to fit over and to close a respective said vessel when said respective vessel enters said microwave tunnel oven means,
    adjustable pressure controlling means comprising,
        a plurality of upper rolling members holding said number of cover tightly against said number of vessel,
    means for springily vary a height of said upper rolling members,
    whereby said adjustable pressure controlling means cooperates with said number of vessel and with said number of cover to selectively control heat effected pressure inside said vessel when said vessel is closed and heated, and to selectively control thereby a loss of moisture of said food product during simmering, pasteurizing, sterilizing or retorting thereof.

2. A microwave autoclave apparatus as claimed in claim 1 wherein said microwave tunnel oven means comprises,
    a passive chamber wherein said heat effected pressure inside said vessel is relaxed down to atmospheric pressure.

3. A microwave autoclave apparatus as claimed in claim 2 wherein, a material of construction of said cover and of said vessel conducts heat, and wherein the relaxation of pressure inside said vessel occurs by conduction and convection of heat from said vessel and from said cover.

4. A microwave autoclave apparatus as claimed in claim 1 wherein,
    said number of vessel is a plurality of vessels linked together to form a chain of vessels which rotates in and out of said microwave autoclave apparatus, and wherein,
    said number of cover is a plurality of covers linked together to form a chain of covers which rotates in and out of said microwave tunnel oven means.

5. A microwave autoclave apparatus as claimed in claim 1 wherein said cover comprises,
   sensor means to interpret pressure and temperature within said vessel.

6. A microwave autoclave apparatus as claimed in claim 5 further comprising,
   means for reading said sensor means, and means for controlling therefrom the operation of said apparatus in an automatic mode.

7. A microwave autoclave apparatus as claimed in claim 1 wherein,
   said adjustable pressure controlling means has mechanical relieving means acting upon a separation of said cover from said vessel for relieving pressure inside said vessel.

8. A microwave autoclave apparatus as claimed in claim 1 wherein,
   said adjustable pressure controlling means is equipped with adjustable mounting devices for adjustably adapt to vessels of different depth.

9. A microwave autoclave apparatus as claimed in claim 1 wherein,
   said adjustable pressure controlling means further comprises spring means acting upon each said upper rolling members for holding each said cover tightly over said respective vessel.

10. A microwave autoclave apparatus as claimed in claim 9 wherein said spring means has sufficient strength to hold each said cover tightly over said respective vessel when said heat effected pressure inside said vessel is a pressure occurring at a temperature above a boiling point of water.

11. A microwave autoclave apparatus as claimed in claim 1 wherein said adjustable pressure controlling means cooperates collectively with all said vessels and with all said covers within said microwave tunnel oven means.

12. A microwave autoclave apparatus as claimed in claim 1 wherein said food product is contained within container which is pellucid to microwave radiation, and wherein said vessel is shaped to receive said container of food product.

13. A microwave autoclave apparatus as claimed in claim 12 wherein said vessel has an aperture in a wall of said vessel for breathing air associated with a placing or a removing of said container into said vessel.

14. A microwave autoclave apparatus as claimed in claim 13 further comprising container transfer means having,
   plunger means through said aperture for shifting said container outwardly from said vessel.

15. A microwave autoclave apparatus as claimed in claim 1 further comprising
   vessel cleaning means for washing, rinsing and drying said number of vessel before said food product is introduced therein, and
   cover cleaning means for washing, rinsing and drying said number of covers before each cover of said number of cover closes a respective vessel.

16. A method for pasteurizing, sterilizing or retorting food product in a continuous mode, and in commercial quantities, using microwave radiant energy, comprising the steps of;
   placing foodstuff in a container which is pellucid to microwave radiation,
   placing said container in a moving vessel having a hollow space shaped to fittingly receive said container,
   said moving vessel being made of a material which is pellucid to microwave radiation,
   covering said moving vessel with a moving cover being adapted to tightly retain substantial pressure inside said hollow space, thereby forming a closed mould,
   said moving cover being made of a material which is pellucid to microwave radiation,
   advancing said closed mould into a microwave chamber,
   heating said closed mould to obtain a pasteurization effect, or a sterilization effect, or a retorting effect, or a simmering effect on the foodstuff contained therein,
   advancing said closed mould into a passive chamber,
   relaxing internal pressure inside said closed mould, when said processing effect is associated with an increase of pressure inside said closed mould,
   opening said closed mould,
   introducing an ingredient into said container,
   covering said moving vessel with another moving cover being also adapted to tightly retain substantial pressure inside said hollow space, thereby forming another closed mould,
   said other moving cover being also made of a material which is pellucid to microwave radiation,
   advancing said other closed mould into another microwave chamber and into another passive chamber to further heat, and relax said container containing said foodstuff, and said new ingredient,
   opening said other closed mould,
   repeating operations of introducing ingredients, covering said moving vessel, heating, relaxing and opening said moving vessel until all ingredients of a recipe contained within said food container are properly processed,
   placing a lid on said container,
   advancing said sealed container into a cooling chamber, for reducing the temperature of said sealed container to a level acceptable for storage condition,
   removing said sealed container from said moving vessel.

17. A method as defined in claim 16 wherein,
   said placement of a lid on said container is done before advancing said sealed container in a microwave chamber, and in a passive chamber.

18. A method as defined in claim 16 wherein all ingredients for a recipe are introduced in said container before advancing said closed mould into a first microwave chamber.

19. A method as defined in claim 16 wherein,
   said placement of foodstuff occurs after said placement of said container into said moving vessel.

20. A microwave autoclave apparatus for simmering, pasteurizing, sterilizing or retorting food product in a continuous mode, and in commercial quantity, using microwave radiant energy, comprising;
   a chain of vessels, each said vessel being made with a material which is pellucid to microwave radiation, each said vessel being shaped to receive said food product,
   a plurality of lower rolling members supporting said chain of vessels,
   a plurality of microwave tunnel oven means, each said microwave tunnel oven means comprising;
   a chain of covers, each said cover being also made with a material which is pellucid to microwave radiation, each said cover being shaped to correspond to an opening of said vessel, a first drive means to move said chain of covers through said microwave tunnel oven means, such that each said cover is synchronized to fit over and to close a respective said vessel when said respective vessel enters each said microwave tunnel oven means, and until said respective vessel exits each said microwave tunnel oven means, adjustable pressure controlling means comprising, a plurality of upper rolling members holding said chain of covers tightly against said chain of vessels, means for springily vary a height of said upper rolling members, to selectively control heat effected pressure inside said vessel when said vessel is closed and heated, a number of at least one filling station to introduce ingredient of a recipe of said food product into said vessel, said one filling station being placed sequentially after at least one said microwave tunnel oven means, and, second drive means to move said chain of vessels through said plurality of microwave tunnel oven means and said at least one filling station, whereby each said vessel is opened after a heating phase for introduction of said ingredient therein.

21. A microwave autoclave apparatus as claimed in claim 20 wherein, said number of filling stations is a plurality of filling stations, and wherein each said filling station is placed either before or after one said microwave tunnel oven means, whereby different ingredients of a recipe are introduced within said vessel at different time intervals.

22. A microwave autoclave apparatus as claimed in claim 20 further comprising, adjustable pressure controlling means further comprising spring means acting upon each said upper rolling members to selectively control heat effected pressure inside said vessels when said vessel is closed and heated, and to selectively control thereby a loss of moisture of said food product during simmering, pasteurizing, sterilizing or retorting thereof.

23. A microwave autoclave apparatus as claimed in claim 22 wherein said adjustable pressure controlling means cooperates collectively with all said vessels and with all said covers within said microwave tunnel oven means.

24. A microwave autoclave apparatus as claimed in claim 20 wherein, said filling station is either a liquid filler, a semi-liquid dispenser, a solid feeder, a manual placement facility or any combination therefrom.

25. A microwave autoclave apparatus as claimed in claim 20 wherein said food product is contained within container which is pellucid to microwave radiation, and wherein said vessel is shaped to receive said container of food product.

26. A microwave autoclave apparatus as claimed in claim 25 further comprising;

a cooling chamber having, means for reducing the temperature inside said container, a chain of holding covers, each said holding cover being made with a material which is pellucid to microwave radiation, each said holding cover being shaped to correspond to an opening of said vessel, a drive means to move said chain of holding covers through said cooling chamber, such that each said holding cover is synchronized to fit over and to close a respective said vessel when said respective vessel enters said cooling chamber, and until said respective vessel exits said cooling chamber, a plurality of upper rolling members and spring means acting upon said upper rolling members for holding said chain of cover tightly against said chain of vessel for retaining a lid over said container during the cooling of said container when said container is sealed before entering said cooling chamber.

27. A microwave autoclave apparatus as claimed in claim 20 wherein said microwave tunnel oven means comprises, a passive chamber wherein said heat effected pressure inside said vessel is relaxed down to atmospheric pressure.

28. A microwave autoclave apparatus as claimed in claim 20 wherein said cover comprises, sensor means to interpret pressure and temperature within said vessel.

29. A microwave autoclave apparatus as claimed in claim 28 further comprising, means for reading said sensor means, and means for controlling therefrom the operation of said apparatus in an automatic mode.

30. A microwave autoclave apparatus as claimed in claim 20 further comprising vessel cleaning means on a return portion of said chain of vessels for washing, rinsing and drying said chain of vessels before each vessel of said chain of vessels enters a first said microwave tunnel oven means, and cover cleaning means on a return portion of each said chain of covers for washing, rinsing and drying each cover of said chain of covers before each said cover closes a respective vessel.

* * * * *